United States Patent
Kim et al.

(10) Patent No.: US 7,945,711 B2
(45) Date of Patent: May 17, 2011

(54) APPPARATUS AND METHOD FOR CONTROLLING POWER TO USB DEVICE

(75) Inventors: Kyung-Beom Kim, Seoul (KR); Young-Hwan Kim, Pocheon-si (KR); Tae-Gyun Kim, Suwon-si (KR); Min-Sick Park, Seoul (KR); Jae-Han Lee, Suwon-si (KR); Gwang-Sig Jang, Seoul (KR); Sang-Hyun Han, Seoul (KR)

(73) Assignee: Pointchips Co., Ltd., Seoul (KR)

( * ) Notice: Subject to any disclaimer, the term of this patent is extended or adjusted under 35 U.S.C. 154(b) by 184 days.

(21) Appl. No.: 12/300,763

(22) PCT Filed: May 15, 2007

(86) PCT No.: PCT/KR2007/002371
§ 371 (c)(1),
(2), (4) Date: Nov. 13, 2008

(87) PCT Pub. No.: WO2007/133038
PCT Pub. Date: Nov. 22, 2007

(65) Prior Publication Data
US 2009/0132730 A1    May 21, 2009

(30) Foreign Application Priority Data
May 16, 2006  (KR) .................. 10-2006-0043840

(51) Int. Cl.
*G06F 3/00*  (2006.01)
(52) U.S. Cl. ............ 710/15; 710/19; 713/300; 713/330; 713/340
(58) Field of Classification Search .................. None
See application file for complete search history.

(56) References Cited

U.S. PATENT DOCUMENTS

| | | | |
|---|---|---|---|
| 6,363,491 B1 | 3/2002 | Endo | |
| 7,644,217 B2 * | 1/2010 | Butler et al. | 710/302 |
| 2003/0070103 A1 | 4/2003 | Kim | |
| 2007/0016813 A1 * | 1/2007 | Naitou et al. | 713/300 |

FOREIGN PATENT DOCUMENTS
EP   1333360 A2 *   8/2003
(Continued)

OTHER PUBLICATIONS

Guo-Shun et al., A Novel Differential VCO Circuit Design for USB Hub, 2005, IEEE, pp. 1-4.*

*Primary Examiner* — Eron J Sorrell
(74) *Attorney, Agent, or Firm* — Sherr & Vaughn, PLLC

(57) ABSTRACT

The present invention relates to an apparatus and method for controlling power to a Universal Serial Bus (USB) device. The present invention provides an apparatus for controlling power to a USB device, the USB device being used to connect a Personal Computer (PC) with a peripheral device, the power control apparatus including a plug-in port for connecting the peripheral device with the PC, a state detector for detecting whether the peripheral device is in a preparation completion state, a power supply unit for supplying power to the USB device, and a power control unit for controlling the power supply unit so that power is supplied to the USB device if it is determined that the peripheral device is in a plugged-in state, and if it is determined that the peripheral device is in a preparation completion state by the state detector. Accordingly, the present invention performs the supply of power only when the peripheral device is plugged into the USB device and its internal application program is in a preparation completion state, so that it can prevent power from being unnecessarily consumed.

2 Claims, 6 Drawing Sheets

FOREIGN PATENT DOCUMENTS

| KR | 20-1999-0012277 | 4/1999 |
| KR | 1020030004816 A | 1/2003 |
| KR | 1020030075494 A | 9/2003 |
| KR | 10-2005-0016304 | 2/2005 |

* cited by examiner

APPPARATUS AND METHOD FOR CONTROLLING POWER TO USB DEVICE

The present application claims priority to Korean Patent Application No. 10-2006-0043840 (filed on May 16, 2006) and PCT Patent Application No. PCT/KR2007/002371 (filed May 15, 2007), all of which is hereby incorporated by reference in their entireties.

TECHNICAL FIELD

The present invention relates to an apparatus and method for controlling power to a universal serial bus device.

BACKGROUND ART

Generally, a computer system includes a computer main body (hereinafter referred to as a 'computer') for handling information, and various peripheral devices for processing the information.

The construction of such a computer system is described with reference to FIG. 1.

As an input means for inputting information to a computer main body 1, there are a keyboard 2, having a plurality of keys, and a mouse 3, which is usefully used for graphic design and the like. Furthermore, a monitor 4, which is a display device for displaying information transmitted from the computer main body 1 on a display screen, is used as an output means.

As peripheral devices of the computer system, a modem, a printer, a sound device and a scanner are used. Each of the peripheral devices must occupy a port acquired through a slot available on the mother board of the computer main body 1. In this case, a user must open the case of the computer main body 1 and insert an interface card for a device, which is to be assigned to a slot, into the board. It is occasionally required to manipulate switches, set jumpers, or set the type of connector, for example, a serial type or a parallel type. Due to such a process, the case where a general user abandons the installation of his or her new devices occurs frequently. Furthermore, the number of slots in the computer is limited, and thus additional peripheral devices cannot be used once all of the slots are occupied by peripheral devices.

In response to a demand for support of a large number of peripheral devices, which are more convenient to use, the specification of Universal Serial Bus (hereinafter referred to as 'USB') has been developed. If such USB is used, it is not necessary for the user to open the case of his or her computer in order to connect peripheral devices or related cards to the computer. Accordingly, providing additional peripheral devices becomes as easy as inserting a desk lamp.

A device such as a keyboard or a monitor is directly connected to the computer, but other peripheral devices can easily be connected to the computer via an extension hub provided in the keyboard or the monitor, or via an independent USB device. Such extension hubs may provide additional connection sockets and may be connected to each other in the form of a hierarchical tree. Respective peripheral devices may be spaced apart from each other or from extension hubs by several meters.

Such USB enables a total of 127 different devices to be connected to a single computer. The USB enables the transmission of an operational voltage of 5V, so that it can eliminate a problem that a large number of currently used peripheral devices consume a large amount of AC power. Furthermore, a fast data transmission rate of 480 Mbits/sec provides extensive processing capability to most peripheral devices having a high bandwidth at only the cost required for current connector technology.

Based on the fact that system and peripheral device manufacturers are adopting such USB, the USB will be a major feature of computer systems in the future. As examples of devices to be connected using the USB, there are a telephone network, a modem, a printer, a microphone, a mouse, a scanner and a digital camera.

The chief effects of such USB are simplicity and convenience. The USB receives information from the computer, and detects the information when devices are additionally provided or removed. Unlike a different typical internal slot, such tasks can be performed in a state in which power is turned on, and do not require the system to be rebooted.

Furthermore, real plug-and-play operation is supported. The USB automatically determines information about resources, such as driver software and bus bandwidth, which are necessary for each peripheral device, and acquires the information so as to be used without the user's interference.

FIG. 2 shows the construction of a computer system to which a USB device is applied.

Referring to FIG. 2, a computer main body 1, a monitor 4, and peripheral devices, such as a printer 5, a scanner 6 and an external modem 7, are disposed around the USB device 10.

FIG. 3 shows the USB device in greater detail.

Referring to FIG. 3, the USB device 10 includes a USB control circuit 11 for controlling the transmission and reception of information between the computer 1 and the peripheral devices using data and a clock signal, which are provided from the monitor 4, a DC-DC converter 12 for providing operational power to a USB control circuit 11 and downstream ports 14 to 16, which are connected to the respective peripheral devices 5 to 7, by processing power supplied from the monitor 4, and an overcurrent protection circuit 13 for preventing damage caused by the occurrence of overcurrent, by detecting the output current of the DC-DC converter 12.

The DC-DC converter 12, which receives a power of 14 V from the monitor 4, is used to supply operational power (5 V) to the USB control circuit 11. In this case, the monitor 4 and the USB control circuit 11 are configured such that the data and the clock signal can be transmitted and received therebetween.

The power of 5V, which is processed through the DC-DC converter 12, is provided to each of the peripheral device 5 to 7 of FIG. 2 via the USB control circuit 11 and the downstream port 14 to 16.

Meanwhile, the computer main body is connected with the upstream port (not shown) of the USB device 10. In this case, it is required that a USB use environment for the computer main body 1 be set. For this purpose, the computer main body 1 automatically supports a USB control environment.

When the peripheral devices 5 to 7 of FIG. 2 are connected to the downstream ports 14 to 16 of the USB device 10, IDentifications (IDs) that are registered in the computer main body 1 are checked. When no error occurs, automatic installation is performed. Accordingly, the user makes use of the peripheral devices without any additional action.

The above-described peripheral devices can operate while transmitting and receiving data to and from the computer main body only when they are plugged in the downstream ports of the USB device 10 and are in a preparation completion state, in which their application programs can be used.

However, in the case where the peripheral devices are plugged into the USB device 10 but are not in a preparation completion state, in which their internal application programs can be used, the respective peripheral devices are displayed on the screen of the computer in the form of icons, but the actual operations corresponding thereto cannot be performed. This is misunderstood by the user as faulty operation and, furthermore, power is consumed in the case. Additionally, in the case where the peripheral devices are not plugged into the USB device 10 but the peripheral devices are in a preparation completion state, in which their internal application programs can be used, power is consumed even when such actual operations are not performed.

DISCLOSURE

Technical Problem

Accordingly, in order to solve the above problems, an object of the present invention is to provide an apparatus and method for controlling power to a USB device, which enables the supply of power only when a peripheral device is plugged into the USB device and its internal application program is in a preparation completion state, thus minimizing power consumption.

Technical Solution

In order to accomplish the above object, the present invention provides an apparatus for controlling power to a USB device, the USB device being used to connect a Personal Computer (PC) with a peripheral device, the power control apparatus including a plug-in port for connecting the peripheral device with the PC; a state detector for detecting whether the peripheral device is in a preparation completion state; a power supply unit for supplying power to the USB device; and a power control unit for controlling the power supply unit so that power is supplied to the USB device if it is determined that the peripheral device is in a plugged-in state, and if it is determined that the peripheral device is in a preparation completion state by the state detector.

Furthermore, the power control unit controls the power supply unit so that power is not supplied to the USB device.

Furthermore, the power control unit controls the power supply unit so that power is not supplied to the USB device if it is determined that the peripheral device is in a plugged-in state but the peripheral device is not in a preparation completion state.

The present invention provides a method of controlling power to a USB device, the USB device being used to connect a PC with a peripheral device, the method including a first step of determining whether the peripheral device is in a plugged-in state; a second step of determining whether the peripheral device is in a preparation completion state if, as a result of the determination, it is determined that the peripheral device is in a plugged-in state; and a third step of performing control so that power is supplied to the USB device if, as a result of the determination, the peripheral device is in a preparation completion state.

Furthermore, the method further includes a step of, if, as the result of the determination of the first step, it is determined that the peripheral device is not in a plugged-in state, interrupting supply of power to the USB device.

Furthermore, the method further includes a step of, if, as the result of the determination of the second step, it is determined that the peripheral device is in a preparation completion state, interrupting supply of power to the USB device.

BEST MODE

Preferred embodiments of the present invention are described below in detail with reference to the accompanying drawings, that is, FIGS. 4 to 6.

Figure 1:
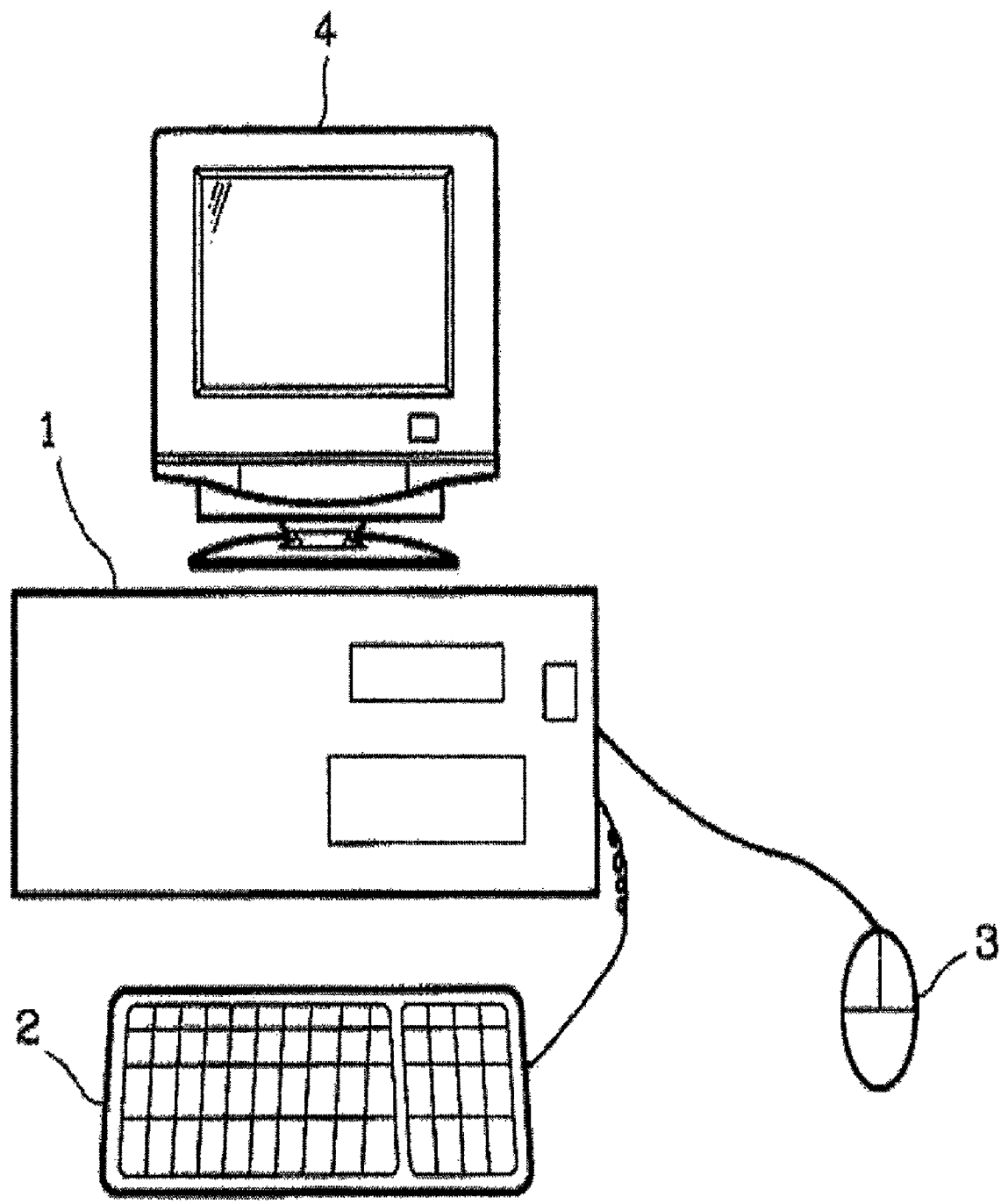
FIG. 1 is a diagram showing the construction of a typical computer system.
Figure 2:
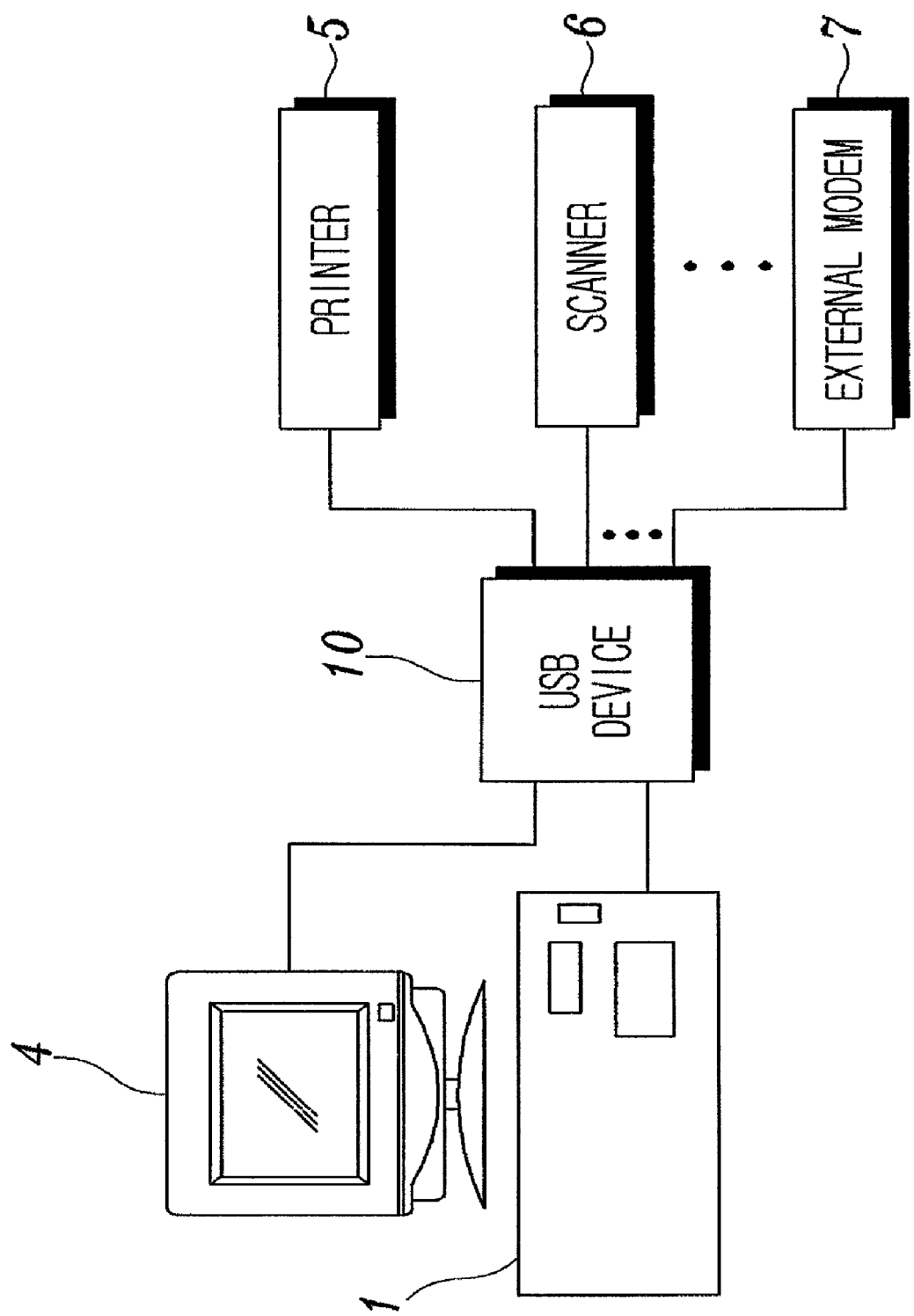
FIG. 2 is a diagram showing the construction of a computer system in which a USB device is installed.
Figure 3:
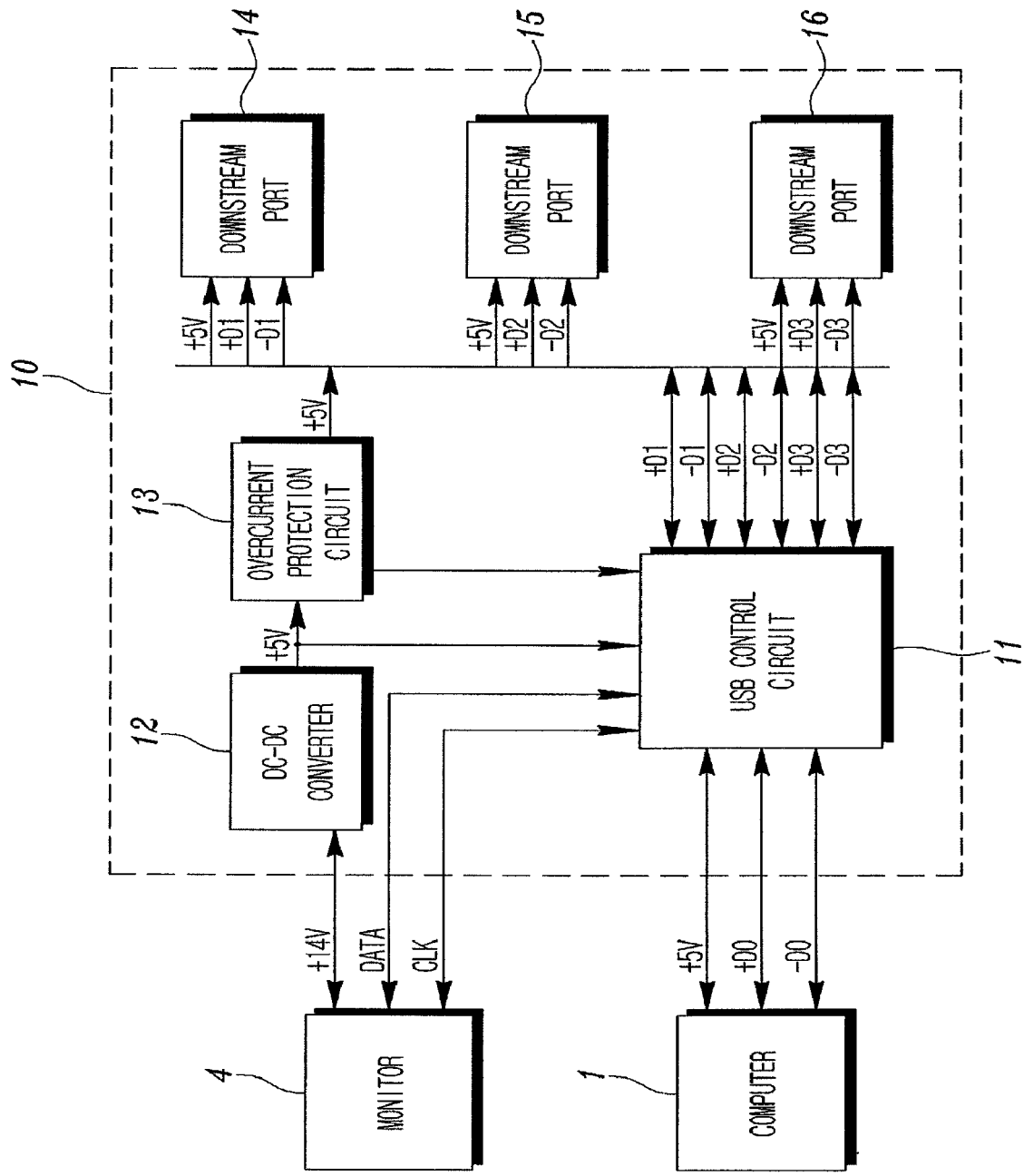
FIG. 3 is a diagram showing the detailed construction of the USB device.
Figure 4:
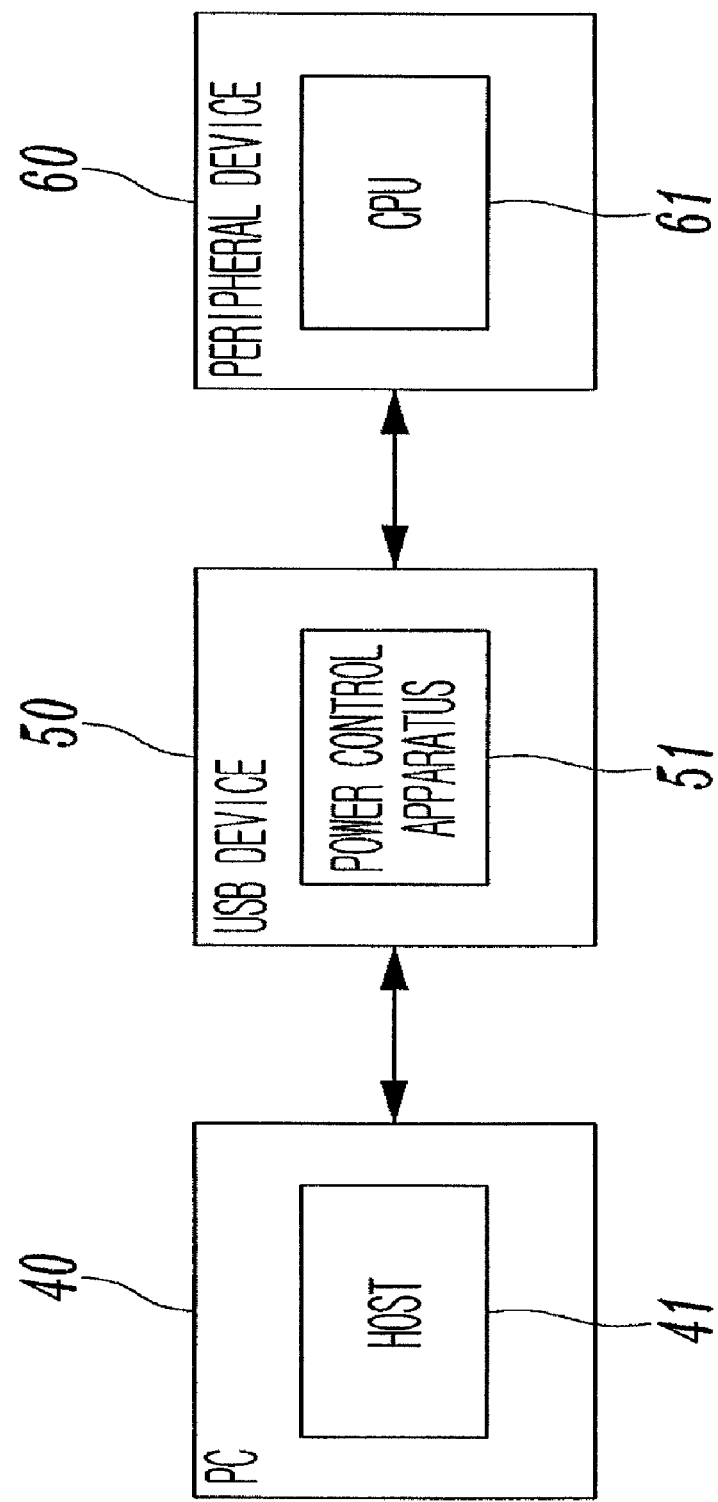
FIG. 4 is a diagram illustrating the construction of an apparatus for controlling power according to the present invention.

FIG. 4 is a diagram illustrating the construction of an apparatus for controlling power according to the present invention.

Referring to FIG. 4, a USB device 50 is configured to connect a PC 40 with a peripheral device 60. The USB device 50 includes an apparatus 51 for controlling power to the USB device 50 therein. The PC 40 includes a host 41 for transmitting and receiving control signals to and from the USB device 50. The peripheral device 60 includes a Central Processing Unit (CPU) for transmitting and receiving control signals to and from the USB device 50. The power control apparatus 51 of the USB device 50 is a device that performs the supply of power if it is determined that a peripheral device 60 is plugged into the USB device 50 and if the CPU of the peripheral device 60 determines that the peripheral device 60 is in a preparation completion state. The power control apparatus 51 receives a power of 5 V from the PC 40 simultaneously when the peripheral device 60 is plugged into the USB device 50. In this case, the power control apparatus 51 does not directly supply power, which is supplied from the PC 40, to the USB device 50, but supplies power, necessary to operate the USB device, to the USB device 50 if it is determined that the peripheral device 60 is in a preparation completion state. Accordingly, the USB device 50 does not unnecessarily consume power, and thus the waste of power can be prevented.

Figure 5:
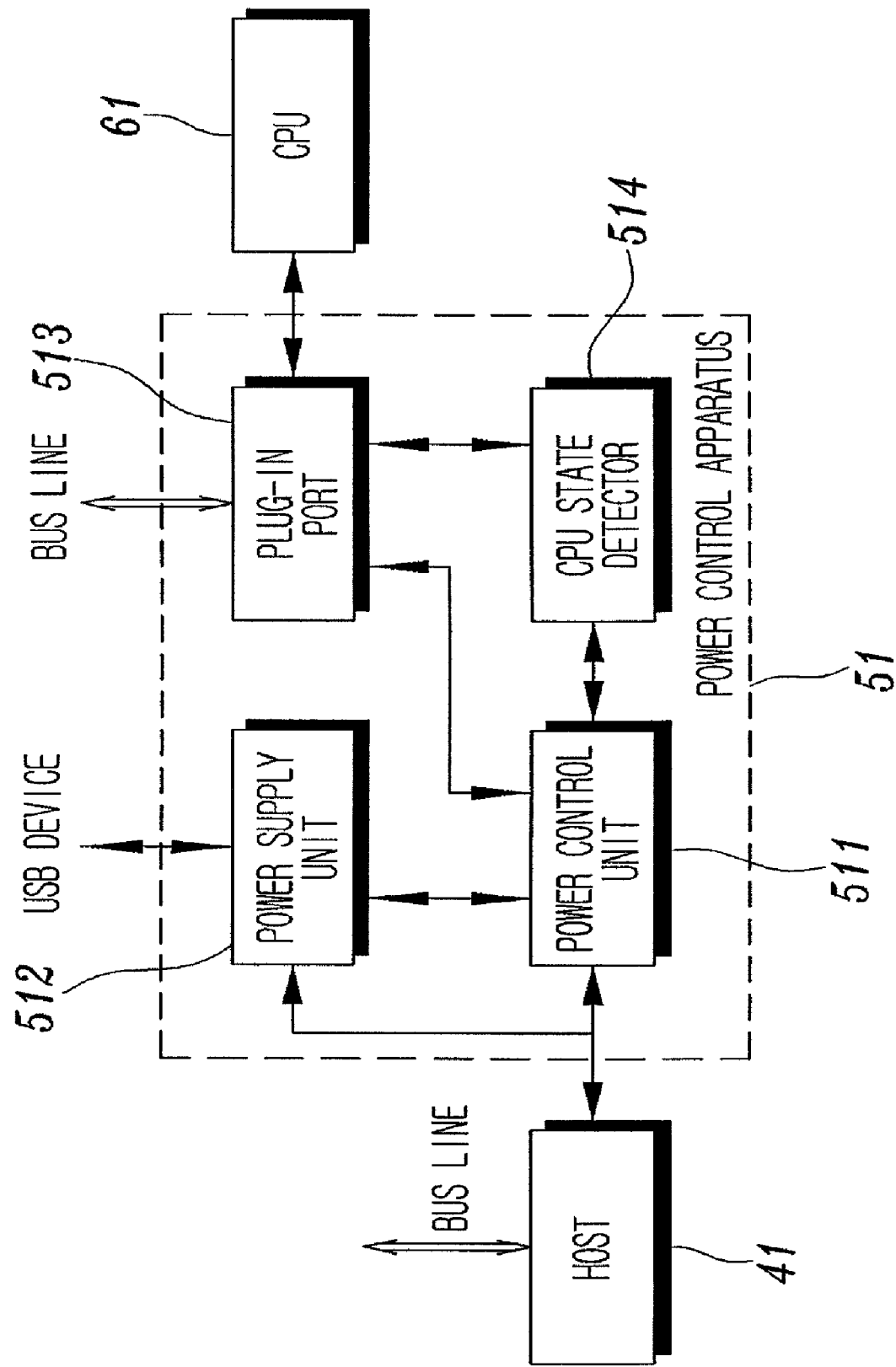
FIG. 5 is a detailed block diagram of the apparatus for controlling power, according to an embodiment of the present invention.

FIG. 5 is a detailed block diagram of the apparatus for controlling power, according to an embodiment of the present invention.

Referring to FIG. 5, the power control apparatus 51 of the USB device 50 includes a power control unit 511 for controlling power supplied to the USB device 50, a power supply unit 512 for supplying the power, a plug-in port 513 for connecting the peripheral device 60 with the PC 40, and a CPU state detector 514 for detecting whether the CPU 61 of the peripheral device 60 is in a preparation completion state. The power control unit 511 and power supply unit 512 of the power control apparatus 51 are connected with the host 41, and the plug-in port 513 is connected with the CPU 61.

In FIG. 5, the plug-in port 513 is a port that is used for plug-in of the peripheral device 60. When the peripheral device 60 is in a plugged-in state, the plug-in port 513 informs the power control unit 511 of this fact. When the peripheral device 60 is in a plugged-in state, the power control unit 511 informs the host 41 of the fact that the peripheral device 60 is in a plugged-in state. The power control unit 511 provides a plug-in signal to the host and, at the same time, and outputs a control signal for detecting the state of the CPU 61 to the CPU state detector 514 in order to detect the state of the peripheral device using the CPU 61 of the plugged-in peripheral device 60. When a state detection request signal is transmitted to the CPU 61 and a response signal for providing notification of the preparation completion state is received from the CPU 61, the CPU state detector 514 informs the power control unit 511 of this fact. If it is determined that the peripheral device 60 is in a plugged-in state and the CPU 61 is in a preparation completion state, the power control unit 511 outputs a control signal, which is used for the supply of power, to the power supply unit 512. The power supply unit 512 supplies power to the USB device 50 under the control of the power control unit 511. Furthermore, when a request signal for the transmission of data is received from the host 41, the power control unit 511 informs the plug-in port 513 of this fact. Thereafter, data transmission and reception between the host 41 and the CPU 61 is performed through the plug-in port 513.

As described above, although the peripheral device 60 is plugged into the USB device 50, the power control apparatus 51 of the present invention performs control so that power is supplied by outputting the control signal for the supply of power at the time point at which it is determined that the peripheral device 60 is in a preparation completion state.

The power control method is described below in greater detail with reference to FIG. 6.

Figure 6:
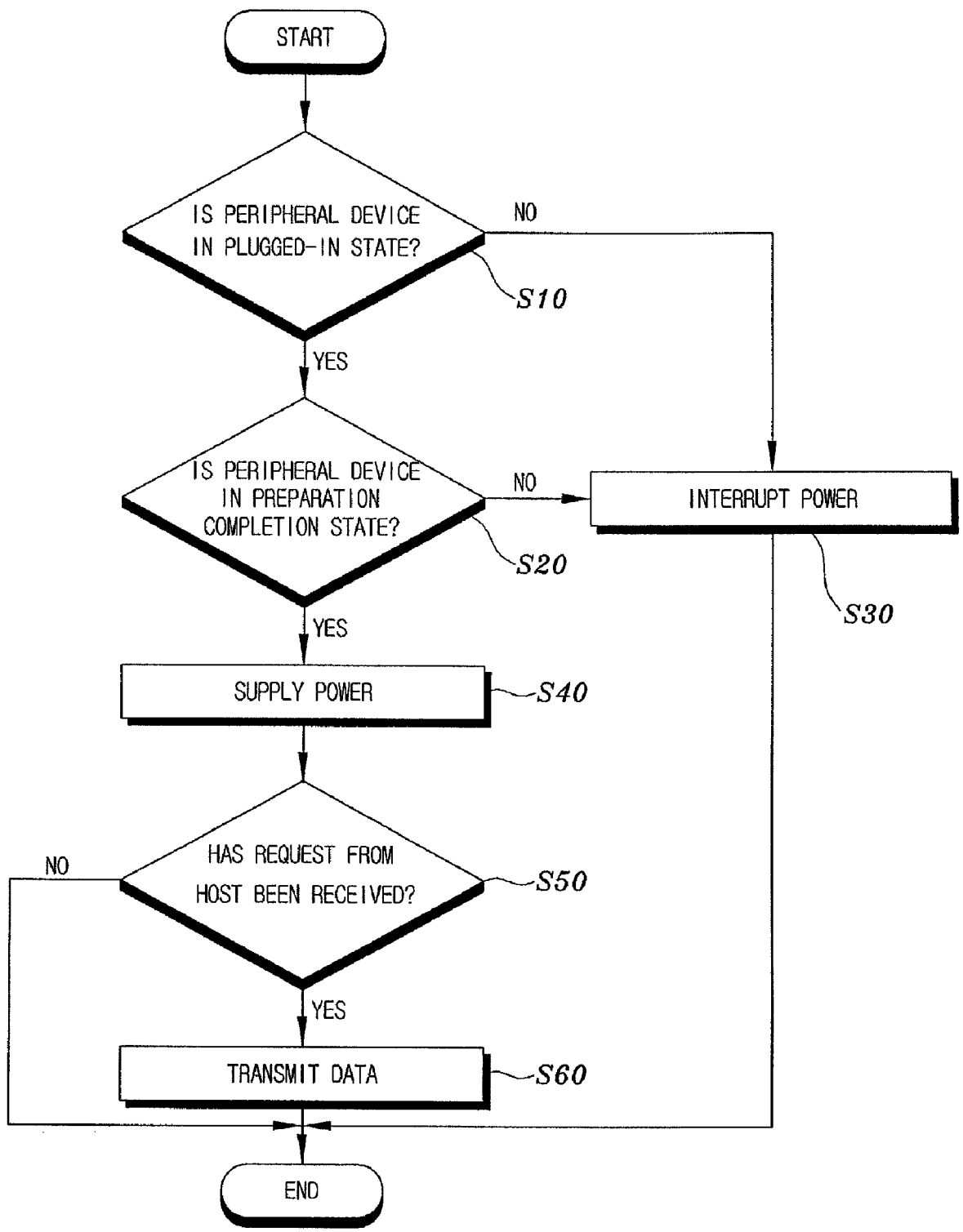
FIG. 6 is a flowchart illustrating a method of controlling power according to an embodiment of the present invention.

FIG. 6 is a flowchart illustrating a method of controlling power according to an embodiment of the present invention.

With reference to FIG. 6, the power control unit 511 determines whether the peripheral device 60 is in a plugged-in state at step S10. If, as a result of the determination, it is determined that the peripheral device 60 is in a plugged-in state, it is determined that the peripheral device 60 is in a preparation completion state at step S20. If it is determined that the peripheral device 60 is in a preparation completion state, the power control unit 511 performs control so that power is supplied at step S40. If it is determined that the peripheral device 60 is not in a plugged-in state, or is not in a preparation completion, the power control unit 511 performs an interruption operation so that power is not supplied at step S30. After the supply of power, whether a request for data transmission has been received from the host is determined at step S50. If it is determined that the request for data transmission has been received, the power control unit 511 performs control so that data can be transmitted at step S60.

INDUSTRIAL APPLICABILITY

Accordingly, the present invention performs the supply of power only when the peripheral device is plugged into the USB device and its internal application program is in a preparation completion state, so that it can prevent power from being unnecessarily consumed.

The invention claimed is:

1. An apparatus for controlling power to a Universal Serial Bus (USB) device configured to connect a Personal Computer (PC) with a peripheral device, the apparatus comprises:
    a plug-in port configured to connect the peripheral device with the PC;
    a state detector configured to transmit a state detection request signal to a Central Processing Unit (CPU) of the peripheral device when the peripheral device is plugged in the plug-in port, and to determine that the peripheral device is in a preparation completion state when a response signal is received from the CPU of the peripheral device in response to the state detection request signal;
    a power supply unit configured to supply power to the USB device; and
    a power control unit configured to control the power supply unit to supply power to the USB device when the state detector determines that the peripheral device is in the preparation completion state after the peripheral device is plugged in the plug-in port and to control the power supply unit to interrupt power to the USB device before the peripheral device is plugged in the plug-in port and before the state detector determines that the peripheral device is in the preparation completion state after the peripheral device is plugged in the plug-in port,
    wherein the apparatus is included in the USB device.

2. A method of controlling power to a USB device, wherein the USB device is configured to connect a PC with a peripheral device, the method comprising:
    determining whether the peripheral device is in a plugged-in state;
    transmitting a state detection request signal to the peripheral device when it is determined that the peripheral device is in the plugged-in state;
    receiving a response signal from the peripheral device in response to the state detection request signal and determining whether the peripheral device is in the preparation completion state based on the response signal; and
    controlling power to be supplied to the USB device when it is determined that the peripheral device is in the preparation completion state based on the response signal and controlling power to be interrupted to the USB device before determining that the peripheral device is in the plugged-in state and before determining that the peripheral device is in the preparation completion state after determining that the peripheral device is in the plugged-in state.

* * * * *